United States Patent [19]
Konstanzer

[11] Patent Number: 5,345,359
[45] Date of Patent: Sep. 6, 1994

[54] PROCESS FOR THE REDUCTION OF THE SWITCH-ON SURGE IN CURRENT DURING THE OPERATION OF AN INDUCTIVE LOAD

[75] Inventor: Michael Konstanzer, Freiburg, Fed. Rep. of Germany

[73] Assignee: Fraunhofer-Gesellschaft zur Förderung der angewandten, München, Fed. Rep. of Germany

[21] Appl. No.: 977,245

[22] Filed: Nov. 16, 1992

[30] Foreign Application Priority Data

Dec. 21, 1991 [DE] Fed. Rep. of Germany ....... 4142644

[51] Int. Cl.$^5$ ............................................. H01H 47/00
[52] U.S. Cl. .................... 361/152; 323/908; 361/111
[58] Field of Search ........................ 361/78, 79, 86, 87, 361/88, 90, 91, 92, 93, 98, 139, 149, 152, 153, 154, 160, 170, 185, 186, 187, 206, 3, 4, 58, 111; 323/908

[56] References Cited

U.S. PATENT DOCUMENTS

| | | | |
|---|---|---|---|
| 4,109,288 | 8/1978 | Berenson | 361/58 |
| 4,791,545 | 12/1988 | Hinckley | 363/81 |
| 5,216,567 | 6/1993 | Kontanzer | 361/3 |

Primary Examiner—Jeffrey A. Gaffin
Attorney, Agent, or Firm—Staas & Halsey

[57] ABSTRACT

In order to reduce the switch-on surge in current in the operation of an inductive load provided with a magnetizable core at an alternating mains current, in particular in pulse group operation, a switch-off-reset impulse is applied to this load following switching-off of the inductive load from the alternating current mains. This impulse has a polarity phased opposite to the last pulse group halfwave. In this way the remanent induction of the transformer core is shifted in a defined manner to lower values so that a defined remanence state of the iron core can be assumed when starting the next pulse group. This permits peak-current-free switching-on under any load and pulse period conditions. The remanent induction of the transformer core can also be maintained in the sector occurring immediately following switching-off of the inductive load, thus at the end of a pulse group. For this purpose voltage of reduced effective value compared to the load, in particular small voltage phases which are in phase with the voltage application prior to the switching-off moment, is applied to the transformer in the pulse group pauses.

12 Claims, 3 Drawing Sheets

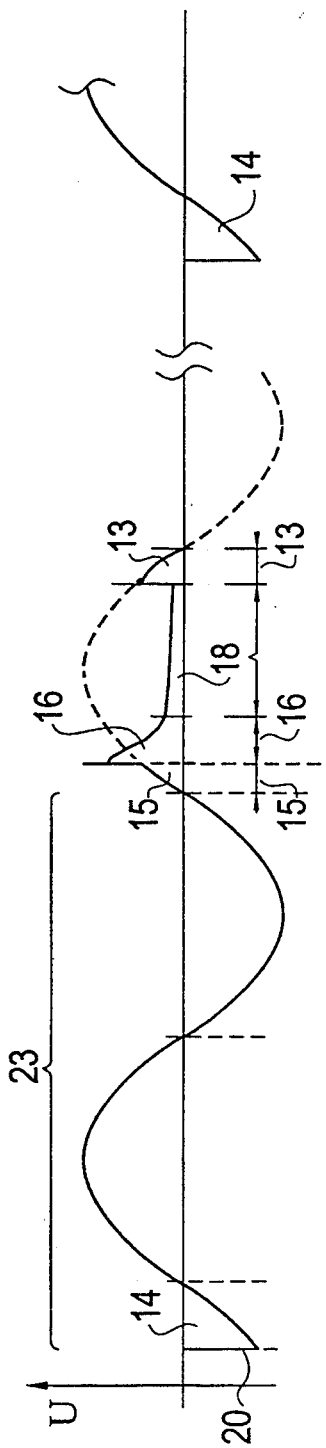
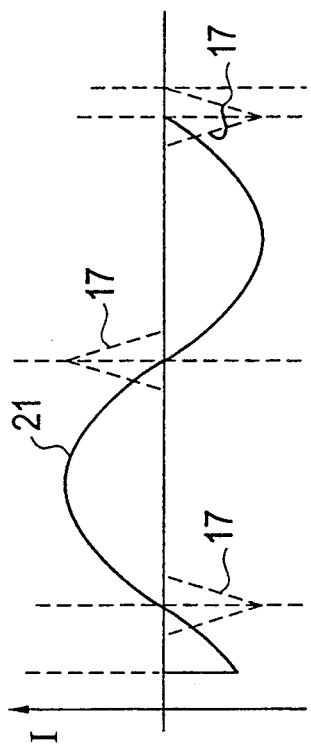
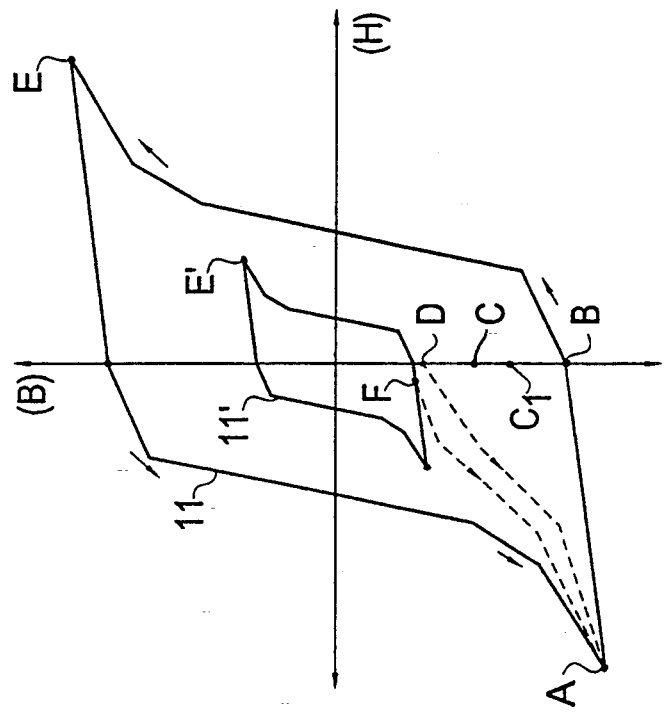
FIG. 2
FIG. 3
FIG. 4

PROCESS FOR THE REDUCTION OF THE SWITCH-ON SURGE IN CURRENT DURING THE OPERATION OF AN INDUCTIVE LOAD

The present invention relates to a process for the reduction of the switch-on surge in current during the operation of an inductive load provided with a magnetizable core at an alternating current mains, in particular a transformer, with at least temporarily a phase operating angle being provided and a switch-off of the load being provided in the zero passage of the driving mains alternating voltage, with a switch-off reset impulse being applied to the inductive load following switch-off thereof from the alternating current mains.

Hitherto there are several different known processes for the reduction of switch-on surges in current during the operation of inductive loads.

Putting the inductive load, following switch-off thereof, into a maximum remanence state by means of a discharge surge of a capacitor is already known from DE 40 11 170. The discharge surge may occur several milliseconds after switching-off from the mains alternating voltage, e.g. during the zero passage, and a subsequent switching-on starts from the set, known remanence state. This switch-on procedure is provided for setting the remanence prior to switching on the inductive load.

With regard to its capacity, the capacitor must be designed according to the size of the transformer and the size of the switched-on load. If utilized in pulse group operation and having varying load conditions the application of a surge of capacitor current is not provided.

Also known from DE 40 11 170 is providing in pulse group operation, with every new switch-on at the start of the pulse group operation, a halfwave phase operation angle which is in phase with the last voltage halfwave prior to switching-off, respectively prior to the end of a pulse group, and which is dimensioned in such a manner that the magnetization in the iron core does not reach saturation. However, in practice tests have shown that peak-current-free switching on of the load is not always attained, because various influential factors change the remanence state of the iron core.

The actually occurring switch-on current peaks, therefore, hitherto necessitate corresponding overdimensioning of the pulse group positioning element components, the transformer which usually forms the inductive load, and the provided fuses. However, the mains can be exposed thereby to high reactive current peaks which can lead to, i.a., considerable disadvantages and to increased current consumption.

It has become apparent that, in particular, the transformer load as well as the period of pauses between the pulse groups are sources of influential factors which alter the remanence position. Moreover, another cause is the circuit of the positioning elements consisting of RC elements by which, in the pulse pauses, an alternating voltage is at the transformer, the amplitude of which, depending on the load at the transformer, may amount to from a few volts up to more than 100 volts (with usual mains voltage). This alternating voltage results in a demagnetization of the iron core in the transformer, with the demagnetization increasing in proportion to the increase in the length of the pause in current flow and to the increase in high-resistance of the load at the transformer during this pause.

The amplitude of the demagnetization alternating voltage depends on, in addition to the magnitude of the resistance and of the capacitor of the RC element, also on the load at the secondary side of the transformer. If the transformer is connected to a large load at the secondary side, the demagnetization alternating current voltage breaks down. Thus no or only little demagnetization occurs, respectively continues longer at low demagnetization voltage. Due to the demagnetization, the remanence state occurring when switching-off at the end of a voltage halfwave is not maintained, but rather the magnetization wanders to lower values and finally, following several full mains waves, passes a smaller hystersis loop within the larger operation hystersis curve. In this manner, however, switch-on conditions are created which deviate considerably from the original remanence state at switching off.

Due to the other influential factors, noteably load variations at the secondary side (and/or on the primary side) of the transformer and varying pause periods between the pulse groups, the remanence state present immediately following switching off also changes so that at the start of a subsequent pulse group the original switch-off remanence state can no longer be assumed in dimensioning the start halfwave phase operating angle. The inexactly predeterminable change in remanence then leads to undesirable switch-on current peaks when switching on. Also to be taken into account is that the remanence change depends on the material of the transformer plate. Remanence changes up to a practically stationary state of magnetization may occur within a period ranging from about 20 milliseconds to several seconds and more depending on the material.

The object of the present invention is to provide a process for the reduction of the switch-on surge in current, in particular, in pulse group operation, which takes the afore-described influential factors into account and due to which switch-on current peaks are avoided.

As a solution to this object, in accordance with the present invention it has been proposed, in particular, that the switch-off-reset impulse be provided within the voltage halfwave following the switch-off moment or one following and in phase with this voltage halfwave for a predetermined period of time within one of these halfwaves and that the switch-off reset be dimensioned with regard to its voltage-time area in relation to the amplitude or the voltage-time area of the overshoot-voltage impulse occurring following switch-off and is set larger in proportion to the decrease of the overshoot voltage impulse.

By means of this switch-off-reset impulse, the demagnetization and therefore also resetting to a stationary value is accelerated and executed in a very short time, with this occurring independent of the load and of the pulse-pause period. As a result, the influential factors present are practically no longer apparent so that, when switching on the load, an exact, known state of operation can be assumed regarding the remanence state. By this means excessive surges in switch-on current can be effectively avoided. It was discovered that the overshoot-voltage impulse depends on the size of the load connected to the transformer. If the switch-off-reset impulse is now set practically inversely proportional to the overshoot-voltage impulse, the result is peak-current-free switching-on of the load even in the case of load variations.

Due to the measure set forth in claim 2 hereto, it is achieved, in particular, that the influence of the presence of a RC circuit parallel to the semiconductor alternating current switch does not have a negative effect. The magnetization of the transformer core running, due to the circuit, in a "small" hysteresis curve during the pulse pauses is located, noteably, in such an in-phase switching-on at a point suited, due to the phase shift between the mains alternating voltage and the magnetic reverse voltage at the transformer, at that switch-on moment, which is without demagnetization.

Determination of the phase operation angle of the start voltage halfwave is provided in this case in such a manner that there is no magnetization saturation. This may, by way of illustration, occur by measuring and checking the reactive currents for symmetry during the next two halfwaves, by checking reactive and active currents for parity or by measuring the no-load current.

An embodiment of the present invention claiming independent protection provides that, in the pulse group pauses, a voltage of an effective value which is reduced compared to the load present is applied to the load operated at the pulse groups and that this partial application invariably occurs in phase to the applied voltage halfwave when there is no load or when there is a load prior to the switch-off moment.

In this way, the change in remanence occurring due to demagnetization or reverse magnetization is practically reversed toward values lower than at the switch-off situation with each application of current and is maintained thereby at a predetermined value.

In particular, the demagnetization by the RC element can be continually reversed. If the load changes markedly or there is no-load, the continual resetting of the remanence has to be corrected accordingly, because the load-dependent "creeping" and self-demagnetization are altered thereby.

Preferably the respective applications of current to the load will be set in the pulse group pauses with regard to their voltage-time areas in relation to the magnitude of the overshoot-voltage impulses following switching off of the load or following an immediately preceding current application impulse, in particular, proportionally thereto. Thus altering the remanent magnetization is selectively reflected even in the event of varying loads and pulse periods. The larger a preceding overshoot-voltage impulse is, the greater will be the selected effective value of the current in the pulse group pauses.

It is useful if a transformer is the load that current is applied in the pulse groups pauses only if there is no load at the secondary side of the transformer. Experiments have shown that demagnetization occurs substantially faster if there is no load connected to the transformer than if it is connected to a load. Therefore, it is not absolutely necessary even if the load is connected to the secondary side in the pulse groups pauses to continually reverse the remanence in the pulse group pauses. This results in, i.e., a reduction of the applied current, as such undesirable, in the current pauses to a tolerable value.

In order to exactly adapt the measures for a defined resetting or raising of the remanence, it may be advantageous, in order to determine the switch-off resetting impulse and/or in order to determine the voltage applied in the pulse group pauses and/or to determine the switch-on moment within a voltage halfwave, to measure the current flowing during the last voltage halfwave prior to switching-off as well as the length of the pulse group pause.

Further embodiments of the present invention are set forth in the other subclaims hereto.

In the following section the present invention and its essential features are made more apparent using the accompanying drawings.

FIG. 1 shows a block diagram for an invented operation of an inductive load at a single phase alternating current mains, FIG. 2 shows the course of the voltage at an inductive load, FIG. 3 shows a diagram which is adjunct to FIG. 2 with the course of the respective currents at the inductive load, FIG. 4 shows a diagram with the representation of the hysteresis curve of an inductive load, FIG. 5 shows a diagram line with the representation of the voltage at an inductive load with pulse group operation and partial application of current in the pulse pauses.

Figure 1:
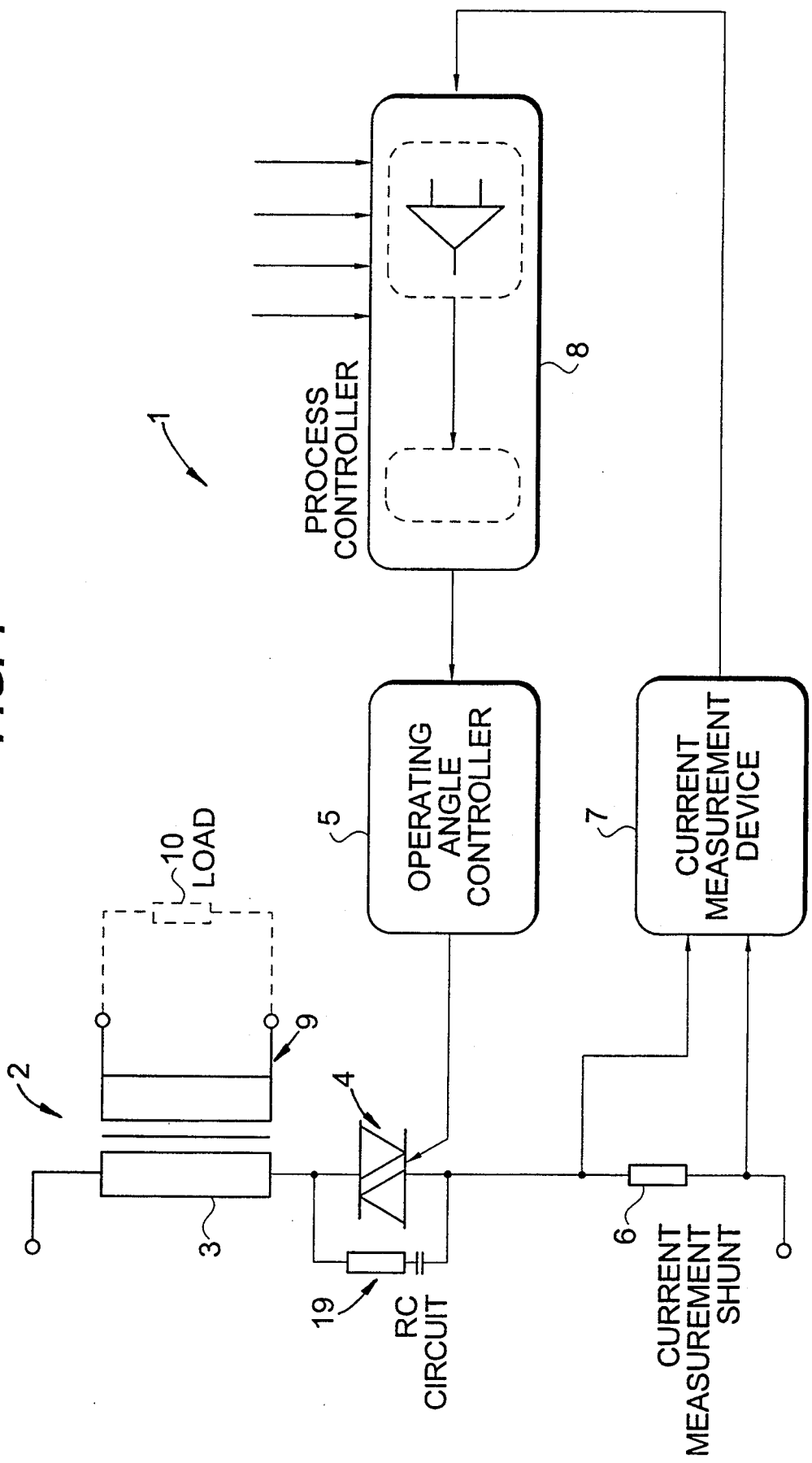
FIG. 1 depicts a possible embodiment of a device 1 for carrying out the invented process and, in particular, for operating a transformer 2, which represents an inductive load, at a single-phase alternating current mains. What holds true for this embodiment in connection with a single-phase mains also counts by analogy for polyphase mains.

The device 1 permits operating an inductive load without the occurrence of excessive switch-on current peaks when switching on. The present invention is concerned, in particular, with pulse group operation in which the transformer 2 or the like is connected to the mains for one or several voltage halfwaves and with a pulse pause being provided thereupon until the next pulse group. Pulse group operation is a possible means of controlling performance and has the advantage that switching on and off takes place in the proximity of the zero passages of the alternating voltage so that disturbing voltages that burden the mains are avoided.

Connected in series to the primary winding 3 of the transformer 2 is an alternating current switch 4 in the form of a triac which is in control connection with a pulse group and phase operating angle control 5. Also connected in series to the alternating current switch 4 in the load current circuit is a current measurement shunt 6 to which is connected a current measurement device 7. Both the active and reactive current can be measured with the aid of the current measurement device 7.

To the control device for the alternating current switch 4 also belongs, in addition to the pulse group and phase operating angle control 5, a process control 8. This process control 8 has, apart from the input coming from the current measurement device 7, further control inputs for a start/stop signal, for the desired phase operation angle and the pulse groups and, if need be, also one or several inputs for a master control.

Various loads 10 may be connected to the secondary winding 9 of the transformer 2. In FIG. 1, an ohmic load is indicated with dashes. By way of illustration, for spot-welding application, the load 10 may be closed welding tongs bridged by the object to be welded.

When switching on the transformer 2 for the first time, the magnetization of the core of the transformer is first brought to a maximum value which corresponds to the points of reversal A or E in the hysteresis curve 11 depicted in FIG. 4. At the turning point A, the magnetization is at the end of the negative mains voltage halfwave and accordingly at the turning point E at the end of the positive voltage halfwave. Various "start procedures" may be employed in order to drive the magnetization to one of the turning points A or E. If there is no load on the transformer, that is there is no load at the primary or secondary side, initially very small in effective value, unipolar, e.g., negative voltage impulses are transmitted to the primary winding 3 of the transformer, with the effective value of the voltage pulse being increased by voltage halfwave phase operating angles being enlarged with the aid of the pulse group and phase operating angle control 5.

Simultaneously, the current is monitored with the aid of the current measurement shunt 6 and the connected current measurement device 7. If a preset current threshold value in the process control 8 is exceeded, this is a sign that the magnetization is located at one of the turning points, by way of illustration at turning point A in the case of the application of negative voltage. The threshold at a turning point is preset in such a manner that magnetization does not go beyond the turning point into the saturation region. The respective voltage phase is the right point for the subsequent full switch on. With this voltage phase, switch-on can then occur optimumly and free of peak currents, as shown in FIG. 2. If approximately symmetrical reactive currents are yielded when there is no load within the directly succeeding alternating voltage period, this is a sign that the magnetization is within the hysteresis curve 11. If there is a load on the transformer, the active and reactive current may also be compared during the first "remanence setting". The voltage halfwave phase operating angle yielded when both the reactive and the active current are the same is then utilized for the further switching-on.

In the embodiment, the transformer 2 is supposed to be operated at the pulse groups, with a certain number of mains voltage full waves forming a pulse group and pulse group pauses being provided therebetween. The power supplied to the load (transformer 2) is yielded by the ratio of the length of the pulse groups to length of the pulse group pauses. Pulse group operation is employed, e.g., in process heaters in industry or in spot-welding.

The phase operating angle determined in the initial switching-on of the transformer is not the optimum angle for all load and pulse pause lengths. Accordingly, the phase operating angle when switching on ought to be adjusted accordingly in dependence on the load and pause periods for current-peak-free switching on. This, however, presents problems, because the adjustment criteria are not known in advance as both the load 10 switched to the transformer and the pauses between the pulse groups may change. These, noteably, lead to changes in the location of the remanent induction which, by way of illustration may then lie between the instable remanence point B (FIG. 4) and, by way of illustration, point C, which is shifted toward lower remanence values, on the induction axis 12. Thus, there is no exactly foreseeable starting situation with regard to the remanence state for the start of the next pulse group.

According to the present invention, after switching off the transformer from the alternating current mains at the end of a pulse group, it is provided that current is applied to the transformer within the pulse pause with a switch-off-reset impulse 13 (cf. FIG. 2). This switch-off reset impulse 13 has a polarity opposite that of the last halfwave of the pulse group. As a result, the magnetization of the core of the transformer is brought into a predeterminable remanence state. The influential factors still present due to load variations or pulse pause variations are made practically ineffectual by this switch-off-reset impulse 13.

In the embodiment, the remanence point which is shifted by the switch-off reset-impulse 13 into a largely stable end position is denoted D. A current-peak-free start of the next pulse group can then ensue from this known remanence position D, in that the phase operating angle for the negative switch-on phase 14 in the embodiment (cf. FIG. 2) is dimensioned in such a manner that the magnetization is brought to the turning point A of the hysteresis curve 11. The switch-off-reset impulse 13 may be provided within the voltage halfwave of the mains alternating voltage following the switch-off point or a succeeding voltage halfwave in phase thereto within the pulse pause. However, the later it is provided, the smaller it must be.

FIG. 2 depicts the course of the voltage at the transformer 2, with the pulse group 23 shown here corresponding to a period of the mains alternating voltage. Immediately following the zero passage of the last voltage halfwave, is a commutation phase 15 and thereupon follows a phase with an overshoot-voltage impulse 16.

The commutation phase 15 comes about because there is a phase shift between the voltage and the reactive current 17 (cf. FIG. 3), with semiconductor alternating current switch 4 formed by a triac not blocking until the current is zero. At this point, the voltage at the transformer has reached the voltage applied at the end of the commutation phase 15. At the zero current point, that is at the end of the commutation phase 15, the magnetization of the iron core of the transformer 2 is at the instable remanence point B. The active current is denoted 21 in FIG. 3.

After a short pulse group pause and/or with a great load 10 connected to transformer 2, the remanence position of the core of the transformer may have changed to the remanence point $C_1$. The remanence point C shows the remanent induction which may set in following a big pulse pause and/or with a small load. The overshoot-voltage impulse 16 depends on the size of the load connected to the transformer 2. The smaller this load is, the larger the overshoot-voltage impulse becomes and correspondingly farther, the position of the remanence of the transformer core is shifted to lower values at a greater distance to the instable remanence point B.

Following the overshoot voltage impulse comes a sector 18 in which the remanent induction gradually decreases. In this phase, a slow "creeping" practically ensues with decreasing induction.

The switch-off reset impulse 13 provided prior to the next switch-on of a pulse group may remain constant in numerous cases of application following a first adjustment. The same holds true for the switch-on phase 14 provided that there is no RC circuit 19 and that the load at the transformer only varies within specific limits and, by way of illustration, 10% of the nominal load is not exceeded. However, if a RC circuit which corrects the magnetization resetting occurring when there is no load is in series with the switch 4, a fixed switch-on-reset impulse 13 may also be operated when there is no load.

In principle, if there is no demagentization without RC circuit influence, the prescribed effective value (voltage time area) of the switch-off-reset impulse 13 depends on the sum of the voltage-time areas of the commutation phase 15, the overshoot-voltage impulse 16 as well as the creep sector 18. Experiments have revealed that the voltage-time areas of the afore-mentioned sectors 15, 16 and 18 in conjunction with the voltage-time area of the switch-off-reset impulse 13 should correspond approximately to the voltage-time area of the switch-on phase 14 at the beginning of a pulse group for a peak-current-free switching-on of the transformer 2 or a similar inductive load. Under this condition, a largely constant remaining distance between the forced remanence point D and the turning point A of the hysteresis curve 11 is yielded. At this point it must be mentioned that the pulse group could also start with a positive halfwave phase instead of with a negative halfwave phase. In this event, due to the remanence point D being farther from the positive turning point E of the hysteresis curve 11, a correspondingly larger current flow angle must be provided. Care must be taken, however, that it is ensured that there is no reverse magnetization of the transformer core due to a RC circuit 19 (cf. FIG. 1), as this could cause unfavorable start conditions due to a phase shift. The starting point then lies with demagnetization (RC circuit) at E' and without demagnetization at D due to which it is then no longer possible to work with a fixed switch-on phase 14 (FIG. 4).

If the switch-off-reset impulse 13 is designed too large, an opposite-phased voltage impulse occurs following the switch-off-reset impulse 13, at least in transformers with a small air gap, e.g. tape-wound (C-core) transformers or transformers with great magnetic induction, partially compensating the influence of the switch-off-reset impulse. Thus, there is practically a "self-control process" which, at least in the aforementioned transformers, affords the possibility of working with fixed switch-on phases 14 and fixed switch-off reset impulses 13.

Drawn in the hysteresis curve 11 in FIG. 4 is also a small hysteresis curve 11'. The reverse magnetization corresponding to this curve 11' occurs by means of an alternating voltage supplied to the transformer 2 via the RC circuit 19 (FIG. 1). This hysteresis curve 11' sets in if total demagnetization has occurred. This is the case, by way of illustration, after a long current pause and, in particular, if the transformer has no load. Starting from the instable remanence point B, shifted demagnetization curves would be yielded in parallel on the induction axis 12 according to the small hysteresis curve 11' until the hysteresis curve runs symmetrically to the diagram zero point, as illustrated. The amplitude of the demagnetization alternating voltage depends not only on the magnitude of the resistance and of the capacitor of the RC circuit 19 but also on the loading of the transformer 2. Due to the influence of the RC circuit 19, for peak-current-free switching-on following a pulse group pause it is provided that the next pulse group is started with a voltage halfwave phase which is in phase with the last switch-off halfwave. Due to the phase shift between the mains alternating voltage and the alternating voltage at the transformer 2 via the RC circuit 19, noteably, the magnetization of the transformer is approximately at point F on the little hysteresis curve 11' (FIG. 4) at the time point 20 in FIG. 2 at the switch-on phase 14, thus almost congruent with the otherwise given remanence position point D. The paths are, therefore, for the most part the same until the turning point A of the hysteresis curve 11 so that switch-on current peaks are also avoided for this operation situation. If one were to start at the next pulse group with a phase operating angle halfwave which is in opposite phase with the phase position of the switch-off halfwave, in the embodiment a positive halfwave, one would have to anticipate a high switch-on peak current as the magnetization would then be approximately at the turning point E' due to the phase shift between the mains alternating voltage and the alternating voltage at the transformer brought there via the RC circuit. In dimensioning the halfwave phase operation angle of the first positive halfwave as in the case of a remanence point D without the influence of the RC circuit, a high switch-on peak current would result due to the substantially shorter path between E' and the turning point E for the magnetization would have been driven far into saturation. As described above, the influence of the demagnetization by the RC circuit 19 can, therefore, be largely compensated by resetting the magnetization on the hystersis curve 11' which is symmetrical relative to the zero point of the coordinate by means of the switch-off-reset impulse 13. In this manner one has, despite the magnetic variation in flux within the little hysteresis curve 11' at the switch-on time point, about the same starting conditions as is the case without the influence of the RC circuit.

Figure 5:
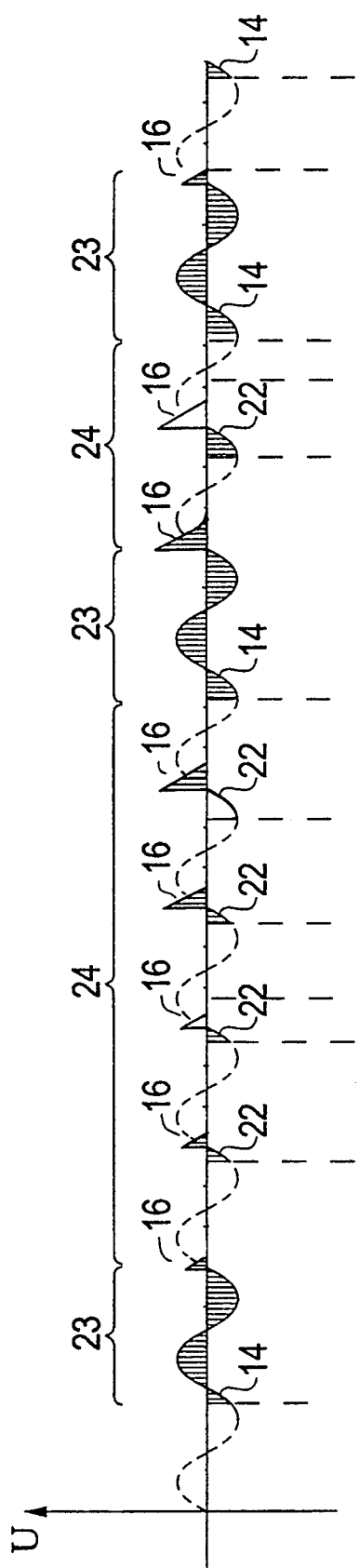
Figure 6:
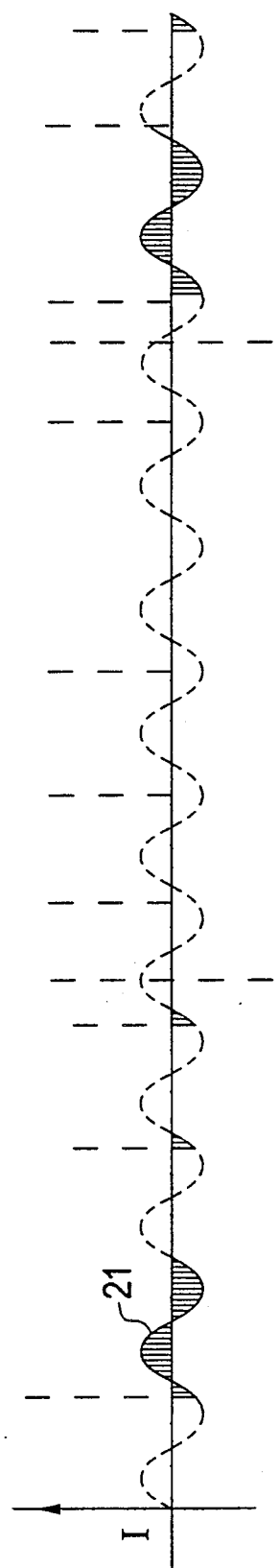
FIG. 6 shows a diagram line which is adjunct to FIG. 5 with the representation of the current and FIG. 7 shows a diagram line which is adjunct to FIGS. 5 and 6 with the representation of the load-switch-in curve.
Figure 7:

FIGS. 5 to 7 show a process in which starting situations, also approximately unvarying in relation to the remanence position, are created for subsequent switching on. In the process according to FIGS. 2 to 4, the remanent induction was specifically shifted by the switch-off reset impulse toward lower values, i.e. toward the zero point. However, the remanent induction may also be shifted, as is described in the following using FIGS. 5 to 7, after switching off the supply voltage at the transformer 2 approximately in the direction toward the remanence point B (FIG. 4). Thus in this case, opposite to FIGS. 2 and 3, the remanence is shifted toward greater values and maintained there in a specific sector. In this case, the switch-on phase 14 must be provided correspondingly smaller. This is achieved by applying to the transformer 2 in the pulse group pauses a voltage with reduced effective value compared to the load, with this voltage application occurring in phase to the last voltage halfwave of a pulse group. These small, in-phase voltage operating angles are denoted with 22 in FIG. 5. The mains alternating voltage is illustrated in FIG. 5 as well as the voltage at the transformer, which is depicted vertically shaded. The time period shows three pulse groups 23 with pulse pauses 24 therebetween. The respective active current 21 is drawn in the adjunct diagram line according to FIG. 6. Finally, the diagram line according to FIG. 7 shows at what time point a load 10 is connected to the transformer 2. Such a situation is yielded, by way of illustration, in spot-welding.

FIG. 5 clearly indicates the voltage phases 22 provided in the pulse pauses 24 and FIG. 6 the respective application of current to the transformer. The opposite-phase overshoot-voltage impulses 16, the magnitude of which depends on the loading of the transformer 2, occur at the end of each application of voltage, i.e. at the end of a pulse group 23 and also at the end of a voltage application with the voltage phases 22. The magnitude of the voltage phase 22 is proportionately altered according to the magnitude (voltage-time area)

of the overshoot-voltage impulses 16. This can be distinctly seen at the end of the first pulse pause 24, where the load at the transformer has been switched off at the moment in time t1. Accordingly, the overshoot-voltage impulse belonging to the next voltage phase 22 after the switch-off moment in time t1 is substantially larger than the preceding one. Accordingly, the magnitude of the next voltage phase 22 is also increased. In this way, the changes in remanent magnetization are selectively taken into account even in the case of load variations 10 and the influence of the demaganetization by the RC circuit 19 and by the "creeping" are eliminated. In FIG. 6, in which the reactive current is depicted, it can also be seen that there is no active current flowing in the load pause between the moments in time t1 and t2. At the end of the second pulse group 23, a very large overshoot-voltage impulse 16 is yielded, because the transformer was operated without a load. Correspondingly, the voltage phase 22 is relatively large. The same is also true then for the third pulse group 23 starting with the relatively large switch-on phase 14. As the load is reconnected to the transformer at the moment in time t2, only a small overshoot-voltage impulse 16 is yielded at the end of the third pulse group 23 so that the next switch-on phase 14 may be, opposite to the preceding one, correspondingly substantially smaller.

In order to control the size of the voltage phases 22 and also of the switch-on phases 14, a measurement of the active current occurs in the pulse pauses 24 with in the case of reduced or no longer present active current, e.g. because the load was switched off, the voltage phases 22 are increasingly enlarged until a set fixed value has been reached so that the demagnetization and the slow reduction of the remanence ("creeping") cannot exert any influence and the transformer induction is maintained close to the instable remanence point B. As already mentioned, the magnitude of the respective next voltage phase 22, respectively switch-on phase 14 depends proportionately on the magnitude of the preceding overshoot voltage impulse 16 including a prescribed fixed value during the no load period.

The aforedescribed process of operation, in particular, is also suited for welding transformers for spot-welding in which welding tongs are connected as the load to the secondary side of the transformer with tong electrodes. If the tongs electrodes are in contact with the spot-welding area, a corresponding load is generated for the transformer, whereas if the tongs are open, the transformer runs with no load. In such spot-welding, the load is continually switched on and off so that there is an increased danger of switch-on current peaks. Due to the invented process according to FIGS. 2 to 4 and according to FIGS. 5 to 7, current peaks can also be avoided in this instance.

Advantageous is in the process according to FIGS. 5 to 7, in particular, if utilized in connection with a spot-welding transformer that no reactive current peaks are generated even if the tong electrodes have faulty contacting, because in the event of no tong contact, the over-shoot-voltage impulse 16 automatically rises and in this case the next voltage phase 22 within a pulse phase 24 or the switch-in phase 14 is set to the correct phase value. Thus, this process permits reactive-current-peak-free switching-on of a spot-welding transformer under all load and pause conditions. In addition, there is also the advantage that the first halfwave of the current application does not have to be, as hitherto, approximately half phase angle operated which would correspond to an initial reduction of the welding current, but rather can be fully switched on and permitting in this manner the reduction of the welding time. This and the avoidance of current peaks contribute to considerable savings in electricity consumption. Furthermore, it obviates overdimensioning the components in the current circuit.

It must also must be pointed out that current can be applied to the transformer in alternating, opposite-poled halfwave operation with a pulse pause always being provided between two opposite-phase halfwaves instead of with a pulse group having at least one period length.

Moreover, it must be mentioned that in order to determine the switch-off-reset impulse and/or to determine the voltage application in the pulse group pauses and/or to determine the switch-on moment in time within a voltage wave, the current flowing during the last voltage halfwave prior to switching off as well as the length of the pulse group pause can be measured. In order to be able to correct mains faults, by way of illustration if a mains voltage halfwave is too small, this can be detected by measurement of the current or of the voltage-time area and the next, mains voltage halfwave opposite-phased thereto and, if need be, also the next can be reduced in their effective value by means of dimming insofar as that the voltage-time areas of the disturbed mains voltage halfwave and of the following mains voltage halfwave are the same. Thereupon, one can dim up again to full mains voltage halfwaves.

If the present mains voltage halfwave is too large, at the end thereof one switches off and starts a new switch-on procedure in which the magnetization is first brought to a turning point A or E of the magnetization curve and one switches on accordingly.

What is claimed is:

1. A process for the reduction of switch-on surges in current in the operation of an inductive load provided with a magnetizable core at an alternating current mains, in particular a transformer, with at least temporarily a phase operating angle being provided and a switch-off of said load being provided in the zero passage of the driving mains alternating voltage, with a switch-off-reset impulse being applied to said inductive load following switch-off thereof from the alternating current mains, characterized in that said switch-off-reset impulse (13) is provided within the voltage halfwave following the switch-off moment in time or a subsequent voltage halfwave in-phase thereto for a predetermined period of time within one of said halfwaves and that said switch-off-reset impulse is dimensioned with regard to its voltage-time area in dependence on the amplitude or the voltage time area of the overshoot-voltage impulse (16) occurring following switching-off and is set proportionately larger, the smaller said overshoot voltage impulse is.

2. A process according to claim 1, characterized in that said inductive load, in particular, a transformer (2), is switched on having a voltage-phase-state present prior to the last switch-off moment in time and that the current flow angle in this switch-on halfwave is dimensioned in such a manner that when there is no load in the immediately following alternating voltage period, approximately symmetrical reactive currents are yielded even in the event of varying loads and varying pause periods.

3. A process according to claim 2, characterized in that said current flow angle in the switch-on halfwave is larger than that of said switch-off-reset impulse (13) and that the difference amounts to at least approximately 50 microseconds in the operation at a 50 hertz alternating current mains.

4. A process according to claim 2, characterized in that in the pulse groups pauses to said inductive load (2) operated at pulse groups is applied a voltage of reduced effective value compared to when there is a load and that this application occurs in phase with the voltage application when there is no load or there is a load prior to said switch-off moment in time.

5. A process according to claim 1, characterized in that said current flow angle in the switch-on halfwave is larger than that of said switch-off-reset impulse (13) and that the difference amounts to at least approximately 50 microseconds in the operation at a 50 hertz alternating current mains.

6. A process according to claim 1, characterized in that in the pulse groups pauses to said inductive load (2) operated at pulse groups is applied a voltage of reduced effective value compared to when there is a load and that this application occurs in phase with the voltage application when there is no load or there is a load prior to said switch-off moment in time.

7. A process according to claim 6, characterized in that the respective applications of current to said inductive load (2) in said pulse group pauses are set with regard to their voltage time areas in dependence of the magnitude of said overshoot-voltage impulse following switching-off of said inductive load (2) or following an immediately preceding current application impulse, in particular, proportionately thereto.

8. A process according to claim 7, characterized in that in a transformer forming said load the current is applied in said pulse group pulses is only when there is no load at the secondary side of said transformer (2).

9. A process according to claim 6, characterized in that in a transformer forming said load the current is applied in said pulse group pauses is only when there is no load at the secondary side of said transformer (2).

10. A process according to claim 9, characterized in that in order to detect a load at the secondary side of said transformer (2), in said pulse group pauses (24) to the latter is applied voltage halfwave phases (22) with small current flow angles, respectively small effective values, with the active current being measured and in the event an active current does not occur, said current flow angle of said voltage halfwave phases (22) is raised to a settable value.

11. A process according to claim 1, characterized in that in order to determine said switch-off-reset impulse (13) and/or in order to determine said voltage application in said pulse group pauses (24) and/or to determine said switch-on moment in time within a voltage halfwave, the current flowing during the last voltage halfwave prior to switching-off and the length of the pulse group pause are measured.

12. A process according to claim 1, characterized in that in the event of mains faults, on the one hand with voltage drops, the mains halfwave following the mains halfwave with a voltage drop is reduced in its effective value by dimming up to the same extent as said voltage drop is reduced, and that, on the other hand, in the event of an overvoltage, the mains halfwave having the same polarity following the occurrence of the overvoltage is reduced in its effective value by dimming.

* * * * *